United States Patent [19]
Yang et al.

[11] Patent Number: 5,135,575
[45] Date of Patent: Aug. 4, 1992

[54] METHOD OF FORMING STABLE DISPERSIONS OF PARTICULATE MATTER

[75] Inventors: Sue L. Yang, Thornwood, N.Y.; Errol D. Goddard, Haworth; Pak S. Leung, Highland Mills, both of N.J.

[73] Assignee: Union Carbide Chemicals & Plastics Technology Corporation, Danbury, Conn.

[21] Appl. No.: 487,977

[22] Filed: Mar. 5, 1990

Related U.S. Application Data

[63] Continuation of Ser. No. 215,608, filed as PCT/US 89/02880, Jul. 6, 1989, abandoned.

[51] Int. Cl.$^5$ ............... C09D 5/08; A61K 7/00
[52] U.S. Cl. ................. 106/287.16; 106/32; 106/243; 106/285; 106/287.1; 106/287.13; 106/287.14; 106/287.24; 106/287.26; 106/287.34; 106/499; 252/308; 252/309; 252/314
[58] Field of Search ........... 252/309, 314, 308; 106/509, 499, 32, 243, 285, 287.1, 287.13, 287.14, 287.24, 287.26, 287.34

[56] References Cited

U.S. PATENT DOCUMENTS

| | | |
|---|---|---|
| 3,083,115 | 3/1963 | Bäder et al. ............ 106/499 |
| 3,311,477 | 3/1967 | Segal . |
| 3,892,577 | 7/1975 | Sugahara et al. . |
| 3,951,849 | 4/1976 | Vickery et al. ............ 252/309 |
| 4,416,790 | 11/1983 | Schurmann et al. . |
| 4,767,741 | 8/1988 | Komor et al. ............ 252/308 |

FOREIGN PATENT DOCUMENTS

| | | |
|---|---|---|
| 665167 | 6/1964 | Belgium . |
| 953010 | 11/1956 | Fed. Rep. of Germany . |
| 207275 | 11/1923 | United Kingdom . |

OTHER PUBLICATIONS

Palit et al., "The Solubility of Heavy Metal Soaps in Co-Solvent Mixtures of Chloroform and Propylene Glycol", *Jour Amer Oil Chem Soc* Jun. 1947.
Chemical Abstracts vol. 73, (1970) 80989Z.
Chemical Abstracts vol. 65 (1966).

*Primary Examiner*—William R. Dixon, Jr.
*Assistant Examiner*—Melissa Bonner
*Attorney, Agent, or Firm*—Bonnie L. Deppenbrock

[57] ABSTRACT

The present invention discloses an improved method for forming stable dispersions of particulate matter. In particular, the present invention relates to a method of forming stable dispersions of particulate matter in both organic and silicone-based fluids.

6 Claims, No Drawings

METHOD OF FORMING STABLE DISPERSIONS OF PARTICULATE MATTER

This application corresponds to International Patent Application Ser. No. PCT/US-89/02880 which claims the Jul. 6, 1988 priority data of parent application U.S. Ser. No. 215,608 now abandoned.

FIELD OF THE INVENTION

The present invention relates to an improved method for forming stable dispersions of particulate matter. In particular, the present invention relates to a method of forming stable dispersions of particulate matter in both organic and silicone-based fluids.

BACKGROUND OF THE INVENTION

The dispersion of particulate matter in various liquid media to yield stable suspensions represents a process of considerable technological importance in such fields as printing inks and paints. It is generally preferred that, consistent with acceptable rheological characteristics, the resulting suspension should have a high level of stability against sedimentation, or settling, of the suspended particulate matter. Alternatively, if settling does occur, the sediment should be redispersible without great difficulty.

Several factors are known to affect the stability of suspensions including size, shape, polarity, charge and density of the particulate matter. Among these the role of size is generally considered to be most important as predicted by Stokes law of sedimentation (or levitation). For practical purposes, if less than about 0.1 micron in size, particles will stay in suspension for many months provided they remain singly dispersed. In fact, a primary objective of most suspension processes is to reduce the size of the particles of the material to be suspended as much as is feasible by mechanical means, such as milling, in the dry state and/or in the suspended state. Milling is often done in the presence of grinding aids or suspension aids to facilitate the generation and/or stabilization of fine particles. Experience has taught that the prevention of agglomeration of primary particles is frequently very difficult.

Three main types of interaction between suspended particles have been defined: (a) electrical (repulsive between like charges); (b) van der Waals; and (c) colloid protection. Broadly speaking, these are influenced by electrical charge, polarity of the medium, and added macromolecules, respectively. The theory of suspension stability is well substantiated for aqueous systems but for non-aqueous systems agreement between theory and practice is less well established.

The conventional approach to achieve improved suspension stability is the addition of "suspension aids". These can be of several different varieties but all seek to render the dispersed particles more compatible with the continuous phase of the dispersion and/or prevent their substantial settling. Conventionally used suspension aids are surfactants and amphiphilic polymers which act by adsorption at the particle/liquid interface. Sometimes a second liquid is added, and usually in appreciable amount, in an attempt to match the polarity of the continuous phase and the particles. Lastly, non-specific thickening of the liquid medium by addition of a suitable polymer is sometimes employed to reduce particle agglomeration and/or settling.

Existing literature teaches that, in contradiction to the present invention, contacting the particulate matter with a second liquid can often have a detrimental effect on suspension stability. The best known case of this is the presence of water in a pigment, such as titanium dioxide, which is dispersed in an organic low polarity liquid. The presence of the water can lead to the formation of rapidly settling agglomerates of the pigment.

Pre-addition of a relatively large amount of a secondary liquid prior to mixing with the primary liquid, or continuous phase, is generally not employed. Belgian Pat. 655,167 discloses a process to improve paint covering power and luster, which involves pretreatment of the pigment with about 40% by weight of water and then with 1% by weight of a surface modifying ingredient, e.g. acetylacetone, followed by heating of the resulting slurry to dryness. Thereafter, this dried, treated powder is dispersed in the dispersed phase.

It has now been found that a process, in which the addition of a suitable secondary liquid to a finely divided powder prior to its blending with the continuous phase is carried out, can materially improve the suspension suitability even though the final concentration of secondary liquid may be so small as to have insignificant influence on the polarity of the continuous phase overall.

SUMMARY OF THE INVENTION

The present invention involves an improved method for forming stable dispersions of particulate matter in organic and/or silicone-based fluids through pretreatment of the particulate matter with an effective amount of a liquid selected from the group of lower molecular weight alcohols, chloroform, acetone and heptane, prior to introduction of the particulate matter into the continuous phase of the dispersion.

DESCRIPTION OF THE INVENTION

This invention is based on the discovery that in certain instances of making dispersions of particulate matter in organic and/or silicone-based fluids, pre-addition of a suitable liquid to the particulate matter can markedly improve the stability of the resulting dispersion.

In the practice of the present invention, the continuous phase of the dispersions to be formed can be organic fluids, silicone based fluids and mixtures thereof.

Preferred as the continuous phase in the formation of dispersions within the scope of the present invention are mineral oils, polyorganosiloxane fluids and polyalkylene glycols.

Particularly preferred is the use of
(a) polyorganosiloxanes of the formula

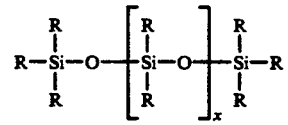

wherein R, which may be the same or different, is an alkyl group having from 1 to about 12 carbon atoms and x has a value from about 5 to about 50,000 and (b) polyalkylene glycols wherein the alkylene group contains from 2 to about 3 carbon atoms.

While the selection of particulate matter is not narrowly critical in the practice of the present invention, it must not be soluble in the continuous phase. Preferred in the practice of the present invention is the use as particulate matter of magnesium stearate, calcium stearate, barium stearate and silica.

The particulate matter may be present in amounts ranging from about 0.01 to about 20% by weight, based upon the weight of the continuous phase. Preferably, the particulate matter is present in amounts ranging from about 0.1 to about 5.0%, on the same basis.

Prior to the addition of the particulate matter to the continuous phase, the particulate matter is pretreated through contact with a liquid selected from the group consisting of lower molecular weight alcohols having 1 to about 8 carbon atoms, halogenated hydrocarbons having 1 or 2 carbon atoms, such as, methylene chloride, chloroform, carbon tetrachloride, methylene bromide, carbon tetrabromide, ethylene dichloride, trichlorethane and the like; aliphatic or cycloaliphatic ketones, having 3 to about 11 carbon atoms, such as, acetone, methylethyl ketone, dibutyl ketone, pentylbutyl ketone, dipentyl ketone, and the like; and aliphatic or cycloaliphatic hydrocarbons having 5 to about 10 carbon atoms, such as, pentane, hexane, isohexane, heptane, octane, nonane, decane, cyclopentane, cyclohexane, cycloheptane, and the like. Preferred lower molecular weight alcohols include ethanol, isopropanol, n-butanol, t-butanol and n amyl alcohol, n-hexyl alcohol, isooctanol, n-nonanol, n-decanol, and the like. The amount of liquid used in pretreatment of the particulate matter ranges from about 1 to in excess of 100% by weight, based upon the weight of the particulate matter. Preferably, from about 5 to about 50% by weight, on the same basis, of liquid is used in the pretreatment of the particulate matter. Most Preferably, from about 25 to about 35% by weight, on the same basis, is employed.

The wet particulate matter pretreated with the liquid may be added to the continuous phase to form the desired dispersion. Drying of the pretreated particulate matter is not required nor is it desired.

Due to the relatively small amount of the pretreatment liquid relative to the continuous phase present in the resulting dispersion, the pretreatment liquid does not unduly influence the character of the continuous phase.

Surprisingly, as exemplified herein, the addition of the pretreatment liquid along with untreated particulate matter directly to the continuous phase results in no increase in the stability of the resulting dispersion. Indeed, in some instances, an adverse effect on the exhibited properties is found.

While not wishing to be bound by the following theory, it is speculated that the interactions which occur between the particulate matter when introduced into the continuous phase is affected by the presence of the pretreatment liquid on the particles. These interactions in turn govern the eventual state of the dispersion and agglomeration of the particulate matter and are thus critical to the stability of the dispersion.

It must be stated that, despite the obvious utility of the present invention, the systems which can benefit from its teachings are not readily predictable and must be determined empirically. Indeed, different samples of nominally the same particulate matter have been found to act differently in response to a particular added pretreatment liquid in sedimentation tests.

The following examples are given to further illustrate the invention but should not be construed as limiting its scope. All percentages set forth hereinafter are by weight unless otherwise noted.

EXAMPLE I

Two parts of powdered Mallinckrodt ® magnesium stearate were mixed with one part of isopropanol (IPA) to form a paste. A 4% solid suspension was prepared by adding an appropriate amount of a blend of polyamylsilicone and polydimethylsilicone oils to the paste and mixing to homogeneity by a roll mill. The resulting homogeneous dispersion was poured into a graduated glass cylinder for measurement of the settling rate.

The above procedures was repeated by replacing IPA with t-butanol, chloroform, heptane and, as a comparative liquid, a blend of polydimethylsilicone oil and polyamylsilicone. A control sample was also prepared by mixing four rams of the magnesium stearate with ninety-six grams of the above blends of silicone fluids. The settling rate of each dispersion was monitored over a period of 3 days. The % settling data is set forth in Table I and refers to the clear top fraction after the particulate matter settled.

TABLE I

| Pretreatment Liquid | 1 day | 2 days | 3 days |
|---|---|---|---|
| None (Control) | 20 | 42 | 47 |
| Silicone fluid | 2 | 13 | 25 |
| IPA | 1 | 2 | 8 |
| t-butanol | 3 | 5 | 9 |
| chloroform | 2 | 4 | 14 |
| heptane | 1 | 2 | 6 |

Improvement in the stability of the dispersion by pre-addition of a pretreatment liquid is apparent. The extent of improvement, however, varies with liquids. Pre-addition of the silicone fluid blend as a control experiment also showed improvement in suspension stability. However, this level of improvement may be due to the mechanical work introduced during mixing. The extent of improvement is much less than that obtained on pre-addition of the four liquids within the scope of the present invention.

EXAMPLE II

One part of Mallinckrodt ® magnesium stearate was mixed with two parts of IPA and allowed to evaporate at room temperature until pastes containing the desired level of IPA were obtained. Thus, pastes containing 5%, 10%, 30% and 50% IPA were prepared. Appropriate amounts of the silicone fluid blend of Example I were then added to the pastes to prepare dispersions containing 4% solids. No mechanical mixing was employed. The dispersions were then poured into glass cylinders and the settling rates were measured. A control sample was also prepared by mixing four grams of the magnesium stearate with ninety six grams of the silicone fluid blend.

TABLE II

| Sample | 1 day | 2 days | 3 days |
|---|---|---|---|
| None (Control) | 20 | 42 | 47 |
| 5% IPA | 12 | 26 | 41 |
| 10% IPA | 2 | 11 | 24 |
| 30% IPA | 2 | 4 | 10 |
| 50% IPA | 6 | 21 | 26 |

The effect of pre-addition of a second liquid is detectable at levels of 5% to 50%.

EXAMPLE III

Appropriate amounts of IPA were mixed with the silicone fluid blend of Example I so that the fluids would contain 0.1%, 0.3%, 0.5%, 1%, and 2% IPA Four parts of Mallinckrodt ® magnesium stearate were then introduced into parts of the individual fluids. The suspensions were then poured into glass cylinders and the settling rates were monitored. The settling rates of all the suspensions were essentially the same, thereby showing that pre-addition of an equivalent amount of a pretreatment liquid to the continuous phase does not affect the stability of the dispersion.

EXAMPLE IV

Two parts of Mallinckrodt ® magnesium stearate were mixed with one part of IPA, then diluted with an appropriate amount of 10 centistoke dimethylsilicone oil to a 6% solid dispersion. The process was repeated with heptane instead of IPA and the settling rates were then measured. A control was also prepared by mixing 6 parts of Mg stearate with 94 parts of the 10 centistoke oil.

TABLE III

| Sample | 1 day | 2 days | 3 days |
|---|---|---|---|
| Control | 6 | 24 | 30 |
| Pre-addition of IPA | 2 | 3 | 9 |
| Pre-addition of heptane | 2 | 11 | 16 |

The effect of pre-addition of the pretreatment liquid on the stability of a dispersion with a different solid level in dimethylsilicone oil was demonstrated.

EXAMPLE V

Two parts of each of Fisher ® calcium stearate, Fisher ® zinc stearate and Methe ® Chemical barium stearate were mixed with one part of IPA, then diluted with an appropriate amount of 10 centistoke dimethyl silicone oil to form 4% solid dispersions. The process was repeated with heptane instead of IPA. The respective control was also prepared without the pre-addition of IPA or heptane. The settling rates of the suspensions were monitored in glass cylinders.

TABLE V

| Sample | Control | Pre-addition of IPA | Pre-addition of heptane |
|---|---|---|---|
| Ca stearate | 30 | 10 | 12 |
| Zn stearate | 30 | 20 | 8 |
| Ba stearate | 62 | 43 | 32 |

EXAMPLE VI

Two parts of Mallinckrodt ® magnesium stearate were mixed with one part of IPA, then diluted with appropriate amount of Witco Carnation ® white mineral oil (65–75 SUS) to form a 4% solid suspension. The process was repeated with heptane instead of IPA. A control wa prepared without pre-addition of IPA or heptane.

TABLE V

| Sample | 1 day | 2 days | 3 days |
|---|---|---|---|
| Control | 11 | 24 | — |
| Pre-addition of IPA | 5 | — | 16 |
| Pre-addition of heptane | 6 | — | 11 |

EXAMPLE VII

Two parts of Fisher ® Zn stearate were mixed with one part of IPA, then appropriate amount of a polypropylene glycol, marketed by Union Carbide as UCON LB-65 to a 4% solid suspension. The process was repeated with heptane instead of IPA. A control was prepared without pre-addition of IPA or heptane.

TABLE VI

| Sample | |
|---|---|
| Control | 58 |
| Pre-addition of IPA | 45 |
| Pre-addition of heptane | 32 |

EXAMPLE VIII

One part of TULLANOX ® 500 hydrophobized silica was mixed with two parts of heptane, then diluted with 10 centistoke dimethyl silicone oil to form a 1% solid suspension. A control was prepared without pre-addition of heptane.

Unlike the suspension of the metallic stearate, this suspension is nearly transparent due to the similarity of the refractive indexes of silica and silicone. However, after settling with time, the accumulation of silica can be detected at the bottom of the glass cylinders. The % volume settled at the bottom is used for the determination of the settling rate.

TABLE VII

| | % volume settled in dimethyl silicone oil | | |
|---|---|---|---|
| Sample | 1 day | 2 days | 3 days |
| Control | 16 | 18 | 17 |
| Pre-addition of heptane | 11 | 12 | 12 |

The material accumulating at the bottom apparently goes through different packing structures. This is shown in the case of the control suspension which accumulates 18% in 2 days, but settles to 17% in 5 days.

We claim:

1. A process for forming a stable dispersion of particulate matter selected from the group consisting of magnesium stearate, zinc stearate, calcium stearate, barium stearate and hydrophobized silica, wherein the particulate matter is insoluble in a continuous phase, which process comprises:
   (1) pretreating the particulate matter with from about 1% to in excess of 100% by weight, based upon the weight of the particulate matter, of a pretreatment liquid selected from the group consisting of:
      (a) lower molecular weight alcohols selected from the group consisting of ethanol, isopropanol, n-butanol, t-butanol, and n-amyl alcohol,
      (b) chloroform,
      (c) acetone and
      (d) heptane
   without substantially removing the pretreatment liquid by drying; and
   (2) introducing the pretreated particulate matter of step (1) into a continuous phase selected from the group consisting of:
      (a) mineral oils,
      (b) polyorganosiloxane liquids,
      (c) polyalkylene glycols wherein the alkylene group contains 2 to 3 carbon atoms, and
      (d) mixtures thereof.

2. The process of claim 1 wherein the polyorganosiloxane liquids are of the formula

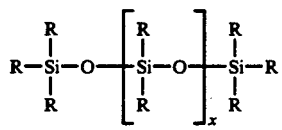

wherein R, which may be the same or different, is an alkyl group having from 1 to 12 carbon atoms and x has a value from about 5 to about 50,000.

3. The process of claim 1 wherein the particulate matter is present in the dispersion in amounts ranging from about 0.01 to about 20% by weight, based upon the weight of the continuous phase.

4. The process of claim 3 wherein the particulate matter is present in the dispersion in amounts ranging from about 0.1 to about 5.0% by weight, based upon the weight of the continuous phase.

5. The process of claim 4 wherein the particulate matter is pretreated with an amount of pretreatment liquid ranging from about 5 to about 50% by weight, based upon the weight of the particulate matter.

6. The process of claim 5 wherein the particulate matter is pretreated with an amount of pretreatment liquid ranging from about 5 to about 35% by weight, based upon the weight of the particulate matter.

* * * * *